United States Patent
Ogino et al.

(10) Patent No.: US 11,813,590 B2
(45) Date of Patent: Nov. 14, 2023

(54) GASOLINE ENGINE EXHAUST GAS PURIFICATION CATALYST, PRODUCTION METHOD THEREFOR, AND EXHAUST GAS PURIFICATION METHOD USING THE SAME

(71) Applicant: UMICORE SHOKUBAI JAPAN CO., LTD., Tokoname (JP)

(72) Inventors: Yuji Ogino, Kobe (JP); Masanori Ikeda, Kobe (JP); Hideki Goto, Kobe (JP)

(73) Assignee: UMICORE SHOKUBAI JAPAN CO., LTD., Tokoname (JP)

(*) Notice: Subject to any disclaimer, the term of this patent is extended or adjusted under 35 U.S.C. 154(b) by 311 days.

(21) Appl. No.: 17/284,977

(22) PCT Filed: Nov. 11, 2019

(86) PCT No.: PCT/JP2019/044191
§ 371 (c)(1),
(2) Date: Apr. 13, 2021

(87) PCT Pub. No.: WO2020/100831
PCT Pub. Date: May 22, 2020

(65) Prior Publication Data
US 2021/0354110 A1 Nov. 18, 2021

(30) Foreign Application Priority Data
Nov. 12, 2018 (JP) .................. 2018-212053

(51) Int. Cl.
| | | |
|---|---|---|
| *B01J 21/04* | (2006.01) | |
| *B01J 35/10* | (2006.01) | |
| *B01J 35/04* | (2006.01) | |
| *B01J 23/42* | (2006.01) | |
| *B01J 23/44* | (2006.01) | |
| *B01J 23/46* | (2006.01) | |
| *B01J 3/02* | (2006.01) | |
| *B01J 37/08* | (2006.01) | |
| *F01N 3/08* | (2006.01) | |
| *B01J 37/02* | (2006.01) | |

(52) U.S. Cl.
CPC .............. *B01J 21/04* (2013.01); *B01J 23/42* (2013.01); *B01J 23/44* (2013.01); *B01J 23/464* (2013.01); *B01J 35/04* (2013.01); *B01J 35/1019* (2013.01); *B01J 35/1023* (2013.01); *B01J 35/1057* (2013.01); *B01J 35/1061* (2013.01); *B01J 35/1076* (2013.01); *B01J 37/0215* (2013.01); *B01J 37/08* (2013.01); *F01N 3/0835* (2013.01); *F01N 3/0842* (2013.01); *F01N 3/0857* (2013.01)

(58) Field of Classification Search
CPC ... B01J 21/04; B01J 23/42; B01J 23/44; B01J 23/464; B01J 35/04; B01J 35/1019; B01J 35/1023; B01J 35/1057; B01J 35/1061; B01J 35/1076; B01J 37/0215; B01J 37/08; F01N 3/0835; F01N 3/0842; F01N 3/0857
See application file for complete search history.

(56) References Cited

U.S. PATENT DOCUMENTS

| | | | |
|---|---|---|---|
| 11,583,831 B2* | 2/2023 | Itani | ........................ B01J 35/026 |
| 2011/0200506 A1 | 8/2011 | Ono et al. | |
| 2013/0142713 A1* | 6/2013 | Ifrah | ...................... B01J 23/002 |
| | | | 423/213.2 |
| 2016/0045896 A1 | 2/2016 | Imada et al. | |
| 2020/0188885 A1 | 6/2020 | Itani et al. | |

FOREIGN PATENT DOCUMENTS

| | | |
|---|---|---|
| JP | 2010227931 A | 10/2010 |
| JP | 2013525255 A | 6/2013 |
| JP | 2015199066 A | 11/2015 |
| JP | 2017217646 A | 12/2017 |
| JP | 2018-143959 A | 9/2018 |
| WO | 2010044453 A1 | 4/2010 |
| WO | 2014156676 A1 | 10/2014 |
| WO | 2018/115436 A1 | 6/2018 |
| WO | WO-2018115436 A1 * | 6/2018 ........... B01D 53/945 |

OTHER PUBLICATIONS

Ifrah et al. and Nedjari et al., Material Letters, (2015), v142, p. 180-183.*
Office Action (The First Notice of Reason for Refusal) dated Dec. 30, 2022, by the Chinese Patent Office in corresponding Chinese Patent Application No. 201980072489.4, and an English translation of the Office Action. (17 pages).
Extended European Search Report dated Dec. 2, 2021, by the European Patent Office in corresponding European Patent Application No. 19884498.7-1104. (20 pages).
(Continued)

*Primary Examiner* — Yong L Chu
(74) *Attorney, Agent, or Firm* — BUCHANAN, INGERSOLL & ROONEY PC

(57) ABSTRACT

A gasoline engine exhaust gas purification catalyst for purifying exhaust gas emitted from a gasoline engine includes a precious metal, alumina, and a ceria/zirconia composite oxide supported on a three-dimensional structure, and has pores having a peak 1 at a pore size of not less than 0.001 μm and not greater than 0.05 μm, pores having a peak 2 at a pore size of not less than 2.5 μm and not greater than 5.0 μm, and pores having a peak 3 at a different pore size than the above pore sizes in a pore size distribution measured by mercury intrusion method, wherein the pore volume of the pores having the peak 3 is greater than 1.4% of the total pore volume. A production method for the catalyst, and an exhaust gas purification method using the catalyst are also described.

7 Claims, 5 Drawing Sheets

(56) References Cited

OTHER PUBLICATIONS

International Search Report (PCT/ISA/210) with an English translation, and Written Opinion (PCT/ISA/237) dated Feb. 4, 2020, by the Japanese Patent Office as the International Searching Authority for International Application No. PCT/JP2019/044191.

Office Action dated Jul. 12, 2023, by the China National Intellectual Property Administration in corresponding Chinese Patent Application No. 201980072489.4, with English translation of the Office Action (8 pages).

* cited by examiner

GASOLINE ENGINE EXHAUST GAS PURIFICATION CATALYST, PRODUCTION METHOD THEREFOR, AND EXHAUST GAS PURIFICATION METHOD USING THE SAME

TECHNICAL FIELD

The present invention relates to a catalyst for purifying exhaust gas emitted from a gasoline engine, a method for producing the catalyst, and a method for purifying exhaust gas emitted from a gasoline engine using the catalyst.

BACKGROUND OF THE INVENTION

Numerous conventional technologies have been proposed for treating exhaust gas generated from internal combustion engines. For the treatment of exhaust gas from gasoline engines, in particular, various technologies have been proposed with the objective of removing hydrocarbons (HC), carbon monoxide (CO), or nitrogen oxides (NOx) contained in the exhaust gas. For example, an exhaust gas purification catalyst in which a catalyst layer which contains a precious metal, a magnesium oxide, and a refractory inorganic oxide as catalyst components and has two peaks originating from the magnesium oxide in a pore distribution obtained by the mercury intrusion method is formed on a three-dimensional structure has been proposed as a catalyst for purifying exhaust gas (WO 2010/044453 (corresponding to US 2011/0200506A1)).

SUMMARY OF THE INVENTION

Technical Problem

However, the conventional catalyst described in WO 2010/044453 has not demonstrated the presence of small pores with a pore size of less than 0.1 μm, and is therefore insufficient from the perspective of pore connection. The catalyst described in WO 2010/044453 is also insufficient from the perspective of effectively utilizing the corner portions of the three-dimensional structure for catalytic reactions.

The present invention was conceived in consideration of the circumstances described above, and an object thereof is to provide a catalyst capable of purifying HC, CO, and NOx contained in exhaust gas emitted from a gasoline engine more efficiently than conventional technology, a production method therefor, and an exhaust gas purification method using the same.

Solution to Problem

The present inventors conducted diligent research to solve the problems described above. As a result, the present inventors discovered that a catalyst having, at a specific pore volume ratio, pores exhibiting a peak at one or more different pore sizes in addition to a pore size of 0.001 to 0.05 μm and a pore size of 2.5 to 5.0 μm in a pore size distribution measured by the mercury intrusion method can solve the problems described above, and thereby arrived at the completion of the present invention.

Specifically, a first aspect of the present invention relates to a gasoline engine exhaust gas purification catalyst for purifying exhaust gas emitted from a gasoline engine; a precious metal, alumina, and a ceria/zirconia composite oxide being supported on a three-dimensional structure; the catalyst having pores having a peak 1 at a pore size of not less than 0.001 μm and not greater than 0.05 μm, pores having a peak 2 at a pore size of not less than 2.5 μm and not greater than 5.0 μm, and pores having a peak 3 at a different pore size than the above pore sizes in a pore size distribution measured by the mercury intrusion method; and the pore volume of the pores having the peak 3 being greater than 1.4% of the total pore volume.

A second aspect of the present invention relates to a production method for a gasoline engine exhaust gas purification catalyst, the method including: preparing a slurry by mixing a pore connecting agent having a combustion decomposition temperature of 150 to 400° C., a precious metal precursor, alumina, and a ceria/zirconia composite oxide; applying the slurry to a three-dimensional structure; and then holding the three-dimensional structure in air at a temperature higher than −150° C. and not higher than +50° C. relative to the combustion decomposition temperature; wherein the content of the pore connecting agent in the slurry is less than 20 mass % in terms of solid content.

A third aspect of the present invention relates to a gasoline engine exhaust gas purification method, the method including treating exhaust gas emitted from a gasoline engine using the exhaust gas purification catalyst of the present invention.

BRIEF DESCRIPTION OF DRAWINGS

In FIG. 1, 1 is a pore having a small pore size (pore 1); 2 is a pore having an intermediate pore size (pore 2); 3 is a pore having a large pore size (pore 3); 10 is a catalyst; 12 is an exhaust gas; 14 is a catalyst layer; and 15 is a three-dimensional structure.

DESCRIPTION OF EMBODIMENTS

Figure 1:
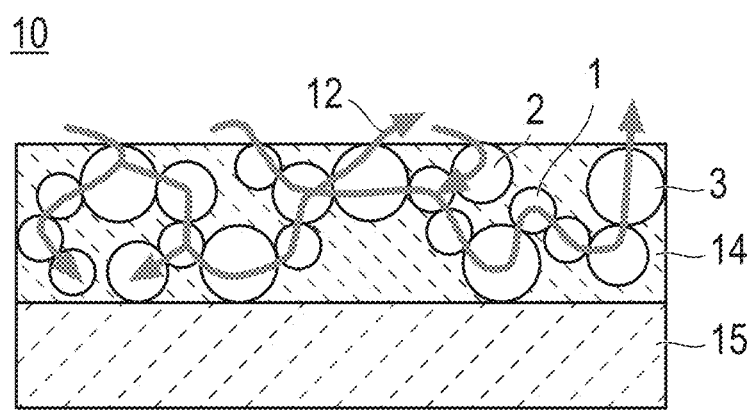
FIG. 1 is a drawing for explaining the exhaust gas purification mechanism according to the catalyst of the present invention.

The first aspect of the present invention relates to a gasoline engine exhaust gas purification catalyst for purifying exhaust gas emitted from a gasoline engine; a precious metal, alumina, and a ceria/zirconia composite oxide being supported on a three-dimensional structure; the catalyst having pores having a peak 1 at a pore size of not less than 0.001 μm and not greater than 0.05 μm, pores having a peak 2 at a pore size of not less than 2.5 μm and not greater than 5.0 μm, and pores having a peak 3 at a different pore size than the above pore sizes in a pore size distribution measured by the mercury intrusion method; and the pore volume of the pores having the peak 3 being greater than 1.4% of the total pore volume. By using the catalyst of the present invention, it is possible to efficiently purify HC, CO, and NOx contained in the exhaust gas emitted from a gasoline engine. In the present specification, a "gasoline engine exhaust gas purification catalyst" is also referred to simply as an "exhaust gas purification catalyst" or a "catalyst". In addition, unless otherwise indicated, "exhaust gas" refers to "gasoline engine exhaust gas".

The second aspect of the present invention relates to a production method for a gasoline engine exhaust gas purification catalyst, the method including: preparing a slurry by mixing a pore connecting agent having a combustion decomposition temperature of 150 to 400° C., a precious metal precursor, alumina, and a ceria/zirconia composite oxide; applying the slurry to a three-dimensional structure; and then holding the three-dimensional structure in air at a temperature higher than −150° C. and not higher than +50° C. relative to the combustion decomposition temperature; wherein the content of the pore connecting agent in the slurry is less than 20 mass % in terms of solid content.

The third aspect of the present invention relates to a gasoline engine exhaust gas purification method, the method including treating exhaust gas (purifying hydrocarbons (HC), carbon monoxide (CO), and nitrogen oxides (NOx) in exhaust gas) emitted from a gasoline engine using the exhaust gas purification catalyst of the present invention.

In the present specification, descriptions of certain aspects of the present invention may be appropriately modified and applied to other aspects.

The catalyst of the present invention is characterized in that peaks exist at three different pore sizes in the pore size distribution, that two of the peaks exist within a specific pore size range, and the remaining peak exists within a different pore size range than the above two peaks. By having such a pore size distribution, hydrocarbons (HC), carbon monoxide (CO), and nitrogen oxides (NOx) contained in exhaust gas emitted from a gasoline engine can be efficiently purified.

Note that in the present specification, a peak at a pore size of not less than 0.001 μm and not greater than 0.05 μm is referred to as "peak 1"; a peak at a pore size of not less than 2.5 μm and not greater than 5.0 μm is referred to as "peak 2"; and a peak at a different pore size than peaks 1 and 2 is referred to as "peak 3". Similarly, a pore having peak 1 at a pore size of not less than 0.001 μm and not greater than 0.05 μm is referred to as "pore 1"; a pore having peak 2 at a pore size of not less than 2.5 μm and not greater than 5.0 μm is referred to as "pore 2"; and a pore having peak 3 at a different pore size than peaks 1 and 2 is referred to as "connected pore 3" or "pore 3". In addition, in the present specification, when multiple peaks are observed within a particular pore size range, the peak with the largest log differential pore volume is selected. Namely, for example, when multiple peaks are observed at pore sizes of not less than 0.001 μm and not greater than 0.05 μm in the pore size distribution, the peak with the largest log differential pore volume within the pore size range of not less than 0.001 μm and not greater than 0.05 μm in the pore size distribution is considered "peak 1".

The catalyst of the present invention has pores exhibiting peaks at three different pore sizes (namely, pores of different sizes). Among the same, pores having a small pore size (pores 1 in FIG. 1) allow the exhaust gas to accumulate in the catalyst layer. Pores having a large pore size (pores 3 in FIG. 1) allow the exhaust gas to diffuse and pass smoothly within the catalyst layer. In addition, pores of different sizes than the pores 1 or the pores 3 described above (pores 2 in FIG. 1) have intermediate functions between them (namely, the pores moderately allow the exhaust gas to accumulate in the catalyst layer and moderately allow the exhaust gas to diffuse and pass smoothly within the catalyst layer). The catalyst of the present invention has a structure in which these three types of pores are arranged so as to connect with one another. Such a structure allows the exhaust gas 12 to penetrate into the pores 1, 2, and 3 of the catalyst layer 14 and to diffuse into most pores through the connecting portions of each of the pores. In addition, since the ease of flow of the exhaust gas differs for the pores 1, 2, and 3 having different pore sizes, the exhaust gas accumulates and diffuses with an appropriate balance.

Figure 6:
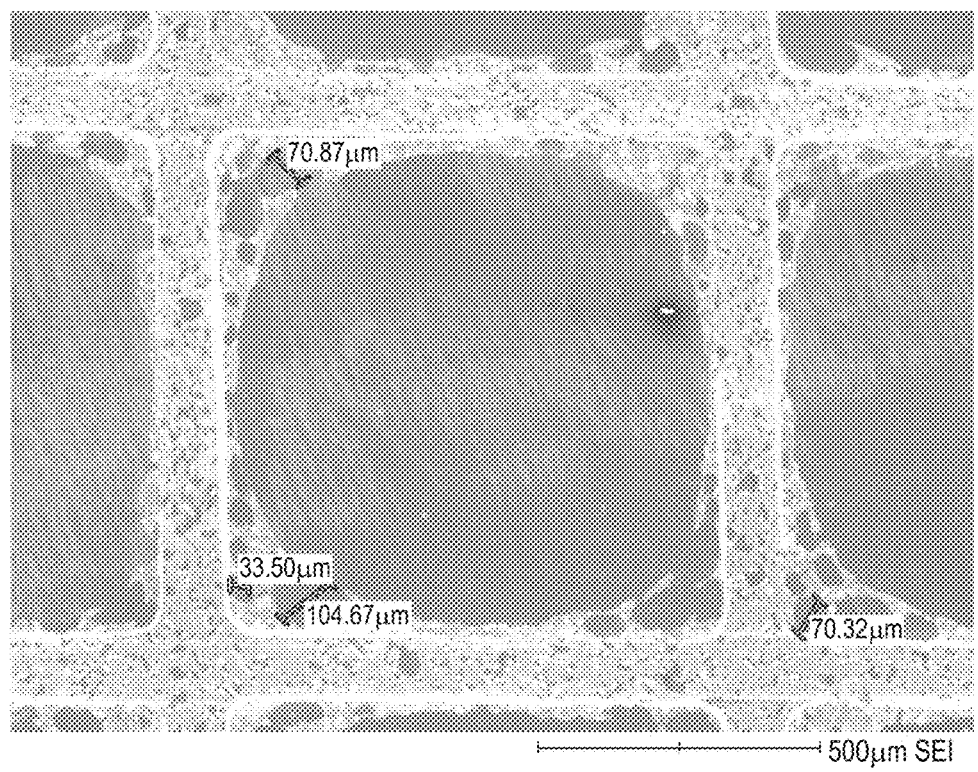
FIG. 6 is an SEM photograph illustrating the state of a catalyst layer (cross-section) formed on the cell inner surface of the catalyst D.

Further, in the present invention, a honeycomb carrier having channels with an angular shape (for example, a triangular shape, a rectangular shape, or a hexagonal shape) is preferably used as the three-dimensional structure. With a honeycomb carrier having such a structure, as illustrated in FIG. 6, the catalyst layer may be formed to be thicker in the corner portions than in the flat portions. In such corner portions, it is particularly difficult for exhaust gas to penetrate into the inside of the catalyst layer. Therefore, when large pores are present in such corner portions, the exhaust gas can penetrate and diffuse into the catalyst layer, which is preferable. Namely, according to a preferable embodiment of the present invention, the three-dimensional structure is a honeycomb carrier having triangular, rectangular, or hexagonal channels, and the precious metal, alumina, and ceria/zirconia composite oxide are supported on the corner portions of the channels so that the catalyst has pores with a pore size of not less than 70 μm. Here, taking into consideration the ease with which exhaust gas penetrates and diffuses into the corner portions, the thickness of the catalyst layer, and the like, it is preferable for pores of 70 to 120 μm to be present in the corner portions, more preferable for pores larger than 72 μm and smaller than 103 μm to be present in the corner portions, and particularly preferable for pores of 75 to 100 μm to be present in the corner portions. In particular, when pores of 75 to 100 μm are present in the corner portions, appropriate pores are formed in the catalyst layer at the corner portions of the carrier. Even with such a thick catalyst layer, since the exhaust gas can penetrate and diffuse into the catalyst layer, the contact between the precious metal and the exhaust gas is further improved, and the exhaust gas purification performance can be exhibited more sufficiently.

Figure 2A:
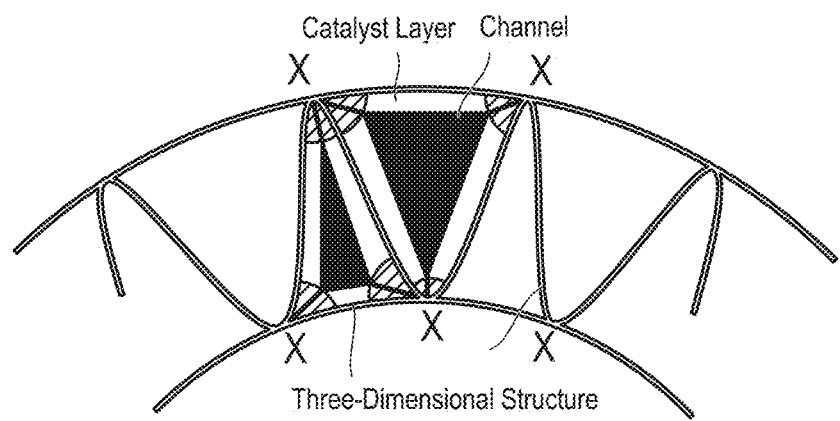
FIGS. 2A and 2B are a drawing for explaining the corner portions of the three-dimensional structure.
Figure 2B:
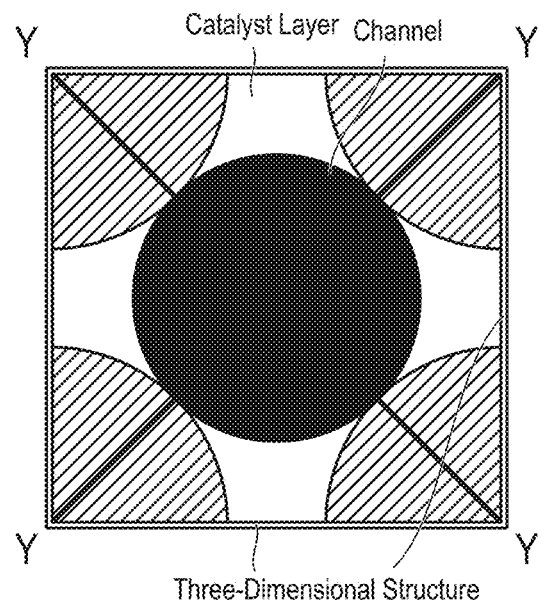

Note that in the present specification, a "corner portion" refers, in the case of a metal three-dimensional structure having a corrugated plate and a flat plate, to a region (shaded area in FIG. 2A) formed between the intersection X of the corrugated plate and the flat plate and the arched portion of the surface of the catalyst layer. In addition, in the case of a three-dimensional structure having straight lines, as illustrated in FIG. 2B, a "corner portion" refers to a region (shaded area in FIG. 2B) formed between the intersection Y of two sides constituting the three-dimensional structure and the arched portion of the surface of the catalyst layer. More specifically, as illustrated in FIG. 2B, a "corner portion" refers to the catalyst layer portion (shaded area in FIG. 2B) of a circle centered on the aforementioned intersection in the region described above, the circle having a radius from the intersection to a point representing the shortest distance to the surface of the catalyst layer. In addition, the presence of pores in the corner portions or the pore sizes thereof can be confirmed or measured by SEM observation of a cross section of the catalyst layer.

Therefore, with such a catalyst, the exhaust gas can be brought into contact with the catalyst component (precious metal) close to the three-dimensional structure inside the catalyst layer 14 efficiently and for an appropriate amount of time. Moreover, since the amount of the catalyst close to the three-dimensional structure of the corner portions, which are difficult to bring into contact with the exhaust gas, is small, the contact efficiency between the exhaust gas and the catalyst component (precious metal) can be increased on the sides where the thickness of the catalyst layer present between the corner portions is small. Such an effect enables the effective purification of the exhaust gas. Therefore, by using the catalyst of the present invention, it is possible to effectively purify exhaust gas (HC, CO, and NOx) emitted from a gasoline engine.

The above effect can be exhibited in the same manner regardless of the temperature of the exhaust gas. Therefore, when the catalyst of the present invention is used, it is possible to exhibit an excellent exhaust gas treating effect for low-temperature exhaust gas of 0 to 600° C. (in particular, including HC, CO, NOx, water vapor, or the like) or low-temperature exhaust gas of 0 to 600° C. after having been exposed to high-temperature exhaust gas of 650 to 1100° C. (in particular, including HC, CO, NOx, water vapor, or the like) from an internal combustion engine for a long period of time. Note that the present invention is not limited to the above estimation.

Embodiments of the present invention will be described hereinafter. Note that the present invention is not limited to only the embodiments described below. Moreover, in the present specification, "from X to Y" represents a range which includes X and Y and means "not less than X and not greater than Y". In addition, unless otherwise indicated, operations and measurements of physical properties and the like are performed at room temperature (20 to 25° C.).

<Gasoline Engine Exhaust Gas Purification Catalyst>

The exhaust gas purification catalyst of the present invention is a catalyst used for the purpose of purifying exhaust gas emitted from a gasoline engine. Exhaust gas emitted from a gasoline engine differs greatly from exhaust gas emitted from a diesel engine in many respects, such as the essential absence of particulate matter (PM), the composition of the exhaust gas (for example, CO, NOx, or HC), and the fact that HC chain lengths are shorter than those emitted from a diesel engine. Therefore, a catalyst having excellent properties for purifying exhaust gas emitted from a diesel engine does not necessarily have excellent properties for purifying exhaust gas emitted from a gasoline engine.

The exhaust gas purification catalyst of the present invention has peaks at no less than three different pore sizes in a pore size distribution measured by the mercury intrusion method, one of the peaks being a peak 1 at a pore size of not less than 0.001 μm and not greater than 0.05 μm. Due to the presence of pores (pores 1) for which a peak (peak 1) is observed at such a small pore size, exhaust gas can be appropriately accumulated in the catalyst layer. Taking into consideration the balance of the penetration/diffusion of exhaust gas into the pores and the accumulation of exhaust gas in the pores, the ease of transferring between the pores, and the like, the pore size of the pores 1 at which the peak 1 (peak of small pores) is observed is preferably greater than 0.005 μm and less than 0.030 μm, more preferably greater than 0.007 μm and less than 0.020 μm, and particularly preferably greater than 0.010 μm and less than 0.015 μm. Taking into consideration the ease of diffusion of the exhaust gas, the ease of transferring between the pores, and the like, the pore volume of the pores 1 having the peak 1 is preferably not less than 3.0% and less than 5.5%, more preferably not less than 3.5% and not greater than 5.2%, even more preferably greater than 3.9% and not greater than 5.0%, and particularly preferably greater than 4.3% and not greater than 5.0% of the total pore volume.

In addition, one of the peaks is a peak 2 at a pore size of not less than 2.5 and not greater than 5.0 μm. Due to the presence of pores (pores 2) larger than the small pores, exhaust gas can smoothly pass through the catalyst layer. Taking into consideration the balance of the penetration/diffusion of exhaust gas into the pores and the accumulation of exhaust gas in the pores, the ease of transferring between the pores, and the like, the pore size at which the peak 2 is observed is preferably greater than 2.7 μm and not greater than 4.0 μm, more preferably greater than 3.0 μm and less than 3.4 μm, and particularly preferably greater than 3.0 μm and not greater than 3.3 μm. In addition, taking into consideration the ease of diffusion of the exhaust gas, the ease of transferring between the pores, and the like, the pore volume of the pores 2 having the peak 2 is preferably not less than 5.0% and less than 10.0%, more preferably not less than 5.5% and less than 8.5%, even more preferably not less than 6.0% and not greater than 8.0%, and particularly preferably not less than 6.2% and less than 8.0% of the total pore volume.

The catalyst of the present invention has pores (pores 3) having a peak 3 at a different pore size than the pore sizes exhibiting the aforementioned peaks 1 and 2, and the pore volume of the pores having the peak 3 is greater than 1.4% of the total pore volume. Here, when the pore volume of the peak 3 is not greater than 1.4% of the total pore volume, pores for controlling the accumulation or diffusion of the exhaust gas are not sufficiently present. Therefore, the contact between the catalyst component (precious metal) inside the catalyst layer and the exhaust gas is poor, and the catalyst performance is diminished (see catalyst G below). Taking into consideration the contact between the catalyst component (precious metal) inside the catalyst layer and the exhaust gas (the ease of penetration/diffusion of the exhaust gas into the pores, more appropriate accumulation within the pores, and greater ease of transferring between the pores) and the like, the pore volume of the pores having the peak 3 is preferably greater than 1.4% and not greater than 5.0%, more preferably not less than 1.5% and not greater than 4.0%, even more preferably greater than 1.5% and less than 3.8%, and particularly preferably not less than 1.6% and less than 3.3% of the total pore volume. Here, the pore volume at which the peak 3 is observed is not particularly limited. Taking into consideration the ease with which the exhaust gas passes through the pores, the ease of transferring between the pores, and the like, the pores having the peak 3 exhibit a peak at a pore size of preferably greater than 0.5 μm and less than 1.0 μm or not less than 90 μm and not greater than 110 μm, more preferably not less than 90 μm and not less than 110 μm, and particularly preferably not less than 95 μm and not greater than 100 μm. In particular, due to the presence of large pores exhibiting a peak at a pore size of not less than 90 μm and not greater than 110 μm, the exhaust gas diffuses smoothly into the catalyst layer on the three-dimensional structure side, and therefore, the exhaust gas efficiently comes into contact with the catalyst component (precious metal), and the catalyst performance can be improved. Note that even when such large pores are present, the pores connect with one another due to the presence of the smaller pores 1 and 2, and the exhaust gas appropriately accumulates and diffuses into the pores of the catalyst layer.

In the present specification, a "peak" is a peak in a pore size distribution (differential pore size distribution) curve obtained by plotting a value (dV/d(log D)) equal to the differential pore volume (dV) divided by the differential value (d(log D)) of the logarithm of the pore size (D) with respect to D, and the log differential pore volume at this peak is greater than 1.0% of the total pore volume. Therefore, cases in which the log differential pore volume is not greater than 1.0% of the total pore volume are not included in the term "peak".

The "pore volume of the peak" is defined as the log differential pore volume (cc/g, mL/g) of the peak determined as described above.

The ratio (%) of the pore volume of the peak to the total pore volume is calculated by dividing the pore volume of each peak determined as described above by the total pore volume (cumulative pore volume of the entire pore size distribution) and multiplying the result by 100 [=(pore volume of the peak/total pore volume)×100].

Pore Size Distribution Measurement

The pore size distribution, the pore size (pore diameter), and the pore volume can be measured by known methods, however, measurement by the mercury intrusion method is preferable. In the present specification, the pore size, the pore volume, and the pore size distribution are measured with reference to the "Catalyst Handbook", edited by the Catalyst Society of Japan, Kodansha, 2008, p. 144. Note that in order to distinguish the pores of the catalyst from the pores of the three-dimensional structure such as a cordierite carrier, measurements are performed after coating the three-dimensional structure with the catalyst components (namely, in a state of the catalyst as a final product in which the precious metal, alumina, a ceria/zirconia composite oxide, or the like is supported on the three-dimensional structure). More specifically, the pore size distribution, the pore volume, and total pore volume are measured by the following methods.

The pore size distribution (differential pore size distribution) of each catalyst is determined by measuring the mercury intrusion curve at a measurement pressure of 1 to 60,000 psia (corresponding to a measured pore size of 0.001 to 1000 μm) after decompression treatment for one hour at 200° C. Here, the mercury intrusion method is based on the law of capillarity, and in the case of mercury and cylindrical pores, this law is expressed by the formula: $D=-(1/P)4\gamma \cos\theta$ (where D represents the pore size (μm); P represents the measured pressure (psia); $\gamma$ represents the surface tension (dyn/cm); and $\theta$ represents the contact angle (°)). Namely, the mercury intrusion method measures the volume of mercury penetrating the pores as a function of the measured pressure P. The pore size distribution is the distribution of D (pore size) calculated as a function of P (measured pressure). The total pore volume is a value equal to the cumulative value of the pore volume in which mercury is pressed to the maximum pressure at the time of measurement (cc(mL)) divided by the catalyst mass (g). In addition, the average pore size (diameter) is the average value of D calculated as a function of P. Note that the surface tension of mercury is 484 dyn/cm, and the contact angle is 130°.

In the obtained pore size distribution, the pore sizes of each of the peaks 1, 2 and 3, the pore volumes of each of the peaks 1, 2, and 3, and the total pore volume are determined. In addition, the ratio (%) of the pore volume of each peak to the total pore volume is determined from the total pore volume and the pore volume of each peak.

Precious Metal

The catalyst of the present invention necessarily contains a precious metal (catalyst component). Here, the type of the precious metal is not particularly limited, however, specific examples thereof include platinum (Pt), palladium (Pd), and rhodium (Rh). These precious metals may be used alone, or two or more types thereof may be used in combination. Among the same, the precious metal is preferably platinum, palladium, and rhodium, more preferably a combination of platinum and/or palladium and rhodium, and particularly preferably palladium and rhodium. Namely, according to a preferable mode of the present invention, the precious metal is at least one type selected from the group consisting of platinum, palladium, and rhodium. According to a more preferable mode of the present invention, the precious metal is preferably at least one of platinum or palladium and rhodium. According to a particularly preferable mode of the present invention, the precious metal is palladium and rhodium.

Here, the amount of platinum (Pt) that is used (supported amount) is not particularly limited, however, taking into consideration the exhaust gas purifying properties, the amount is preferably from 0.01 to 20 g, more preferably from 0.05 to 10 g, and most preferably greater than 0.5 g and less than 5 g in terms of precious metal per 1 liter of the three-dimensional structure.

The amount of palladium (Pd) that is used (supported amount) is not particularly limited, however, taking into consideration the exhaust gas (in particular, HC) purifying properties, the amount is preferably from 0.01 to 20 g, more preferably from 0.05 to 5 g, and most preferably from 0.3 to 3 g in terms of precious metal per 1 liter of the three-dimensional structure.

The amount of rhodium (Rh) that is used (supported amount) is not particularly limited, however, taking into consideration the exhaust gas (in particular, NOx) purifying properties, the amount is preferably from 0.01 to 20 g, more preferably from 0.05 to 5 g, and most preferably from 0.1 to 3 g in terms of precious metal per 1 liter of the three-dimensional structure.

In addition, when the precious metals are platinum and palladium, the mixing ratio of platinum and palladium (platinum:palladium (mass ratio)) is preferably from 50:1 to 1:1, from 40:1 to 1:1, from 30:1 to 1.1:1, from 20:1 to 1.3:1, or from 5:1 to 1.5:1 in this order. The exhaust gas purification efficiency can be improved as the range of the mixing ratio of platinum and palladium falls within the preferable range described above.

In addition, when the precious metals are palladium and rhodium, the mixing ratio of palladium and rhodium (palladium:rhodium mass ratio)) is preferably from 30:1 to 1.1:1, more preferably from 20:1 to 1.3:1, and particularly preferably from 5:1 to 1.5:1. The exhaust gas purification efficiency can be improved as the range of the mixing ratio of palladium and rhodium falls within the preferable range described above.

Nitrates, acetates, amine salts, ammonium salts, or the like can be used as raw materials of the precious metals (palladium and rhodium), and nitrates (examples: palladium nitrate and rhodium nitrate) are more preferable.

The amount of the precious metal source is not particularly limited, however, an amount that allows the content (supported amount) of each precious metal described above to be achieved is preferable. Note that when two or more types of precious metal sources are used in combination, the total amount of the precious metal sources is preferably an amount that allows the contents (supported amounts) of the precious metals described above to be achieved.

Alumina

The alumina used in the catalyst of the present invention is not particularly limited as long as the alumina contains an oxide of aluminum, and examples thereof include activated alumina such as γ-, δ-, η-, and θ-alumina, lanthana-containing alumina, silica-containing alumina, silica-titania-containing alumina, and silica-titania-zirconia-containing alumina. One type of alumina may be used alone, or two or more types thereof may be used in combination. Among the same, γ, δ, or θ-alumina and lanthana-containing alumina are preferable from the perspective of high-temperature durability and high specific surface area. In the case of lanthana-containing alumina, the lanthana content ratio in the lanthana-containing alumina is preferably from 0.5 to 8 mass % and more preferably from 1 to 5 mass %. Note that in the present specification, an X-containing alumina means that the alumina contains aluminum at a ratio greater than half of the total amount (molar ratio in terms of metal) and contains the X component at the remaining ratio. For example, in the case of lanthana-containing alumina, the ratio of moles of aluminum (Al) to the total moles of lanthanum (La) and aluminum (Al) constituting the lanthana-containing alumina [=Al/(La+Al)] is greater than 0.5.

The properties of the alumina are not particularly limited, however, from the perspectives of suppressing degradation at the temperature of the exhaust gas, heat resistance, and the like, it is preferable for there to be little change in specific surface area at 700° C. or higher and preferably 1000° or higher. From the above perspective, the melting point of the alumina is preferably not lower than 1000° C., more preferably from 1000 to 3000° C., and even more preferably from 1500 to 3000° C.

In addition, the BET specific surface area of the alumina is not particularly limited, however, from the perspective of supporting the catalyst component, the BET specific surface area is preferably from 50 to 750 $m^2/g$, more preferably from 120 to 750 $m^2/g$, and particularly preferably from 150 to 750 $m^2/g$. With such a specific surface area, a sufficient amount of the precious metal (catalyst component) can be supported on the alumina, which makes it possible to increase the contact area between the catalyst components and the exhaust gas or to adsorb the reactant. As a result, reactivity of the entire catalyst can be further increased.

The shape of the alumina is not particularly limited, and any shape such as granular, particulate, powdery, cylindrical, conical, prismatic, cubic, pyramidal, or amorphous, for example, may be used, however, the alumina is preferably granular, particulate, or powdery and more preferably powdery. When the alumina is granular, particulate, or powdery, the average primary particle size of the alumina is preferably from 5 to 20 nm and more preferably from 5 to 10 nm. Within such a range, the pores 1 can be formed more efficiently. Note that in the present specification, the average primary particle size of the alumina, the ceria/zirconia composite oxide, and the refractory inorganic oxide can be measured by a transmission electron microscope (TEM). In addition, the average secondary particle size of the alumina (prior to milling) is preferably from 20 to 150 μm and more preferably from 30 to 90 μm. Within such a range, the pores 2 can be formed more efficiently. In addition, the catalyst component can be efficiently supported on the surface of the alumina. Note that in the present specification, the average secondary particle sizes of the alumina, the ceria/zirconia composite oxide, and the refractory inorganic oxide can be measured by a laser diffraction/scattering type particle size distribution measurement device. Note that in the present specification, the "particle size" refers to the maximum distance among the distances between any two points on the contour line of the granular, particulate, or powdery sample.

The content (supported amount) of alumina is not particularly limited, however, the content is preferably from 10 to 300 g and more preferably from 50 to 200 g per 1 L of the three-dimensional structure. When the content of alumina per 1 L of the three-dimensional structure is 10 g or greater, the precious metal can be sufficiently dispersed in the alumina, and a catalyst that is more sufficiently durable can be obtained. Meanwhile, when the content of alumina is 300 g or less, the contact state between the precious metal and the exhaust gas is good, and exhaust gas purification performance can be exhibited more sufficiently.

Ceria/Zirconia Composite Oxide

The ceria/zirconia composite oxide ($CeO_2$—$ZrO_2$) used in the catalyst of the present invention acts as an oxygen storage material and, in particular, has the feature of a fast oxygen storage and release rate. Here, the oxygen storage material (also referred to as an "oxygen storage and release material") has a function of storing oxygen in an oxidizing atmosphere (lean) and releasing oxygen in a reducing atmosphere (rich) proportionately with fluctuations in the air-fuel ratio (A/F), which changes depending on the driving state, so as to allow oxidation/reduction reactions to proceed stably.

The ceria/zirconia composite oxide may contain at least one metal selected from the group consisting of lanthanum (La), yttrium (Y), neodymium (Nd), and praseodymium (Pr). Specific examples include ceria/zirconia/lanthana composite oxides and ceria/zirconia/lanthana/yttria composite oxides.

The BET specific surface area of the ceria/zirconia composite oxide is not particularly limited, but is preferably from 50 to 750 $m^2/g$ and more preferably from 80 to 250 $m^2/g$. The shape of the ceria/zirconia composite oxide is not particularly limited, and any shape such as granular, particulate, powdery, cylindrical, conical, prismatic, cubic, pyramidal, or amorphous, for example, may be used, however, preferably granular, particulate, or powdery. When the ceria/zirconia composite oxide is granular, particulate, or powdery, the average secondary particle size of the ceria/zirconia composite oxide is preferably from 1 to 50 μm and more preferably from 5 to 20 μm.

The content of the ceria/zirconia composite oxide (supported amount; in terms of oxide) is not particularly limited, however, the content is preferably from 5 to 200 g, more preferably from 5 to 100 g, and even more preferably from 10 to 90 g per 1 liter of the three-dimensional structure. Among the same, the content of cerium (Ce) contained in the ceria/zirconia composite oxide (oxygen storage material) in terms of oxide ($CeO_2$) is preferably from 5 to 200 g, more preferably from 5 to 100 g, and even more preferably from 5 to 50 g per 1 liter of the three-dimensional structure.

In addition, the content of zirconia (Zr) contained in the ceria/zirconia composite oxide in terms of oxide ($ZrO_2$) is preferably from 5 to 200 g, more preferably from 10 to 150 g, and even more preferably from 20 to 100 g per 1 liter of the three-dimensional structure. Further, when the ceria/zirconia composite oxide further contains lanthanum (La), the content of La contained in the ceria/zirconia composite oxide in terms of oxide ($La_2O_3$) is preferably from 1 to 50 g, more preferably from 1 to 35 g, and even more preferably from 1 to 20 g per 1 liter of the three-dimensional structure. In addition, when the ceria/zirconia composite oxide further contains yttrium (Y), the content of Y contained in the ceria/zirconia composite oxide in terms of oxide ($Y_2O_3$) is preferably from 0 to 50 g, more preferably from 0 to 35 g, and even more preferably from 0 to 20 g per 1 liter of the three-dimensional structure. Further, when the ceria/zirconia composite oxide further contains neodymium (Nd), the content of Nd contained in the ceria/zirconia composite oxide in terms of oxide ($Nd_2O_3$) is preferably from 0 to 50 g, more preferably from 0 to 35 g, and even more preferably from 0 to 20 g per 1 liter of the three-dimensional structure. In addition, when the ceria/zirconia composite oxide further contains praseodymium (Pr), the content of Pr contained in the ceria/zirconia composite oxide in terms of oxide ($Pr_6O_{11}$) is preferably from 0 to 50 g, more preferably from 0 to 35 g, and even more preferably from 0 to 20 g per 1 liter of the three-dimensional structure. When the ceria/zirconia composite oxide (Ce, Zr, La, Y, Nd, and/or Pr) is contained in such an amount, the oxidation/reduction reactions can be allowed to proceed stably.

Further, the catalyst according to the present invention contains alumina and a ceria/zirconia composite oxide, however, the mixing ratio (mass) ratio of alumina and the ceria/zirconia composite oxide is preferably from 10:1 to 1:10, more preferably from 10:2 to 5:10, and most preferably from 10:3 to 10:10. With such a ratio, a sufficient amount of the precious metal (catalyst component) can be supported on alumina, which makes it possible to increase the contact area between the catalyst components and the exhaust gas and allows the ceria/zirconia composite oxide to sufficiently adsorb hydrocarbons (HC), carbon monoxide, and nitrogen oxides (NOx) in the exhaust gas. As a result, the reactivity of the entire catalyst can be further increased, and the exhaust gas purification performance can be further increased.

The crystal structure of the ceria/zirconia composite oxide (oxygen storage material) may be cubic, tetragonal, monoclinic, or orthorhombic, however, the shape is preferably cubic, tetragonal, or monoclinic and more preferably cubic or tetragonal.

(Refractory Inorganic Oxide)

The catalyst of the present invention may further contain a refractory inorganic oxide in addition to alumina and the ceria/zirconia composite oxide. Here, the refractory inorganic oxide has a high specific surface area, and supporting the catalyst component thereon makes it possible to increase the contact area between the catalyst component and the exhaust gas or to adsorb the reactant. As a result, the reactivity of the entire catalyst can be further increased.

The refractory inorganic oxide preferably has a small amount of change in specific surface area at a temperature of 800° C. or higher and preferably 1000° C. or higher. The BET specific surface area of the refractory inorganic oxide is preferably from 50 to 750 $m^2/g$ and more preferably from 80 to 250 $m^2/g$ from the perspective of supporting the catalyst component.

The refractory inorganic oxide may have any shape such as granular, particulate, powdery, cylindrical, conical, prismatic, cubic, pyramidal, or amorphous, for example, however, the shape of the refractory inorganic oxide is preferably granular, particulate, or powdery and more preferably powdery. When the refractory inorganic oxide is in granular, particulate, or powdery form, the average primary particle size of the refractory inorganic oxide is preferably 5 nm to 20 nm and more preferably 5 nm to 10 nm. Within such a range, the pores 1 can be formed, which is preferable. In addition, the average secondary particle size of the refractory inorganic oxide prior to milling described below is preferably from 20 to 150 µm and more preferably from 50 to 90 µm. Within such a range, the pores 2 can be formed, which is preferable.

Examples of the refractory inorganic oxide include zeolite, titania, zirconia, and silica. One type of refractory inorganic oxide may be used alone, or two or more types thereof may be used in combination. Among the same, zirconia is preferable from the perspective of high-temperature durability and high specific surface area.

The content of the refractory inorganic oxide is preferably from 10 to 300 g and more preferably from 50 to 200 g per 1 L of the three-dimensional structure. When the content of the refractory inorganic oxide per 1 L of the three-dimensional structure is 10 g or greater, the precious metal can be sufficiently dispersed, and a catalyst that is sufficiently durable can be obtained. Meanwhile, when the content of the three-dimensional structure is 300 g or less, the contact state between the precious metal and the exhaust gas is good, and exhaust gas purification performance can be exhibited more sufficiently.

Pore Connecting Agent

The specific pore size distribution according to the present invention, which is described in detail below, is controlled by the pore connecting agent and the pore connecting conditions (in particular, the combustion decomposition temperature and the pore connecting temperature). It is speculated that when the slurry contains a pore connecting agent in this way, the specific pore size distribution according to the present invention is achieved as follows. Note that the present invention is not limited by the following speculation. For example, in the pore size distribution, a peak (peak 1) observed in the pore size range of not less than 0.001 µm and not greater than 0.05 µm, a peak (peak 2) observed in the pore size range of not less than 2.5 µm and not greater than 5.0 µm, and a peak (peak 3) observed in a pore size range outside the above pore size ranges (in particular, not less than 90 µm and not greater than 110 µm) are selected. Of the peaks of the three different pore sizes, peak 1 has a small pore size (smallest pore size in a preferable mode) and is presumed to be a peak associated with pores present in alumina and or the ceria/zirconia composite oxide. Peak 2 is a peak having a larger pore size than the peak 1 and is presumed to be a peak associated with pores derived from moisture in the slurry or the precious metal source (starting material of the precious metal) (pores formed when the precious metal source is reduced to a precious metal) or pores present in the three-dimensional structure. Peak 3 is a peak having a pore size other than that of peaks 1 or 2. In a preferable mode, this is the peak having the largest pore size and is presumed to be a peak associated with pores (connected pores 3) formed by the pore connecting agent. The connected pores 3 are pores formed by a mass of gas generated when the pore connecting agent is combusted in the pore connecting step described below, or by the combustion of pore connecting agent at once in the calcining step described below. By mixing the pore connecting agent into a slurry, the pores of peaks 2 and 3 (pores 2 and 3) can be formed efficiently in the pore connecting step (d) or the calcining step (e) described below.

Note that the fact that "the catalyst has pores (connected pores) derived from a pore connecting agent" can be determined by a known method such as elemental analysis. For example, when the pore connecting agent contains carbon atoms, the presence or absence of the pore connecting agent can be examined by measuring the carbon content in the catalyst by a known method such as elemental analysis. More specifically, the amount of carbon (C) (Ci amount (mass %)) in the catalyst is measured by elemental analysis. When the amount of carbon is not less than 0.04 mass %, the catalyst is assessed as having pores derived from the pore connecting agent. Note that in the present specification, the amount of carbon in the catalyst is measured in accordance with the following method. A sample for elemental analysis is prepared by cutting the catalyst, collecting a central portion 50 to 70 mm from the end face of the catalyst near the center of the catalyst, and peeling the catalyst layer from the collected sample while using a microscope. Elemental analysis is performed using a fully automatic elemental analyzer Vario EL Cube (manufactured by Elementar) in accordance with the manufacturer's instructions.

The pore connecting agent has a combustion decomposition temperature of 150 to 400° C. Here, when the combustion decomposition temperature of the pore connecting agent is lower than 150° C., the evaporation of water that could not be removed in the drying step described below and the combustion of the pore connecting agent occur simultaneously, so preferable connected pores are not formed. Therefore, the specific pore size distribution according to the present invention cannot be achieved. In addition, when the combustion decomposition temperature of the pore connecting agent is 400° C. or higher, the decomposition of nitrates and the combustion of the precious metal source (nitrates, in particular) and the combustion of organic components proceed simultaneously and in parallel because the combustion decomposition temperature of the pore connecting agent and the calcining temperature are close to one another. Thus, the specific pore size distribution according to the present invention cannot be achieved. Taking into consideration the ease of controlling the specific pore size distribution according to the present invention, operability, and the like, the combustion decomposition temperature of the pore connecting agent is preferably from 180 to 380° C., more preferably higher than 200° C. and lower than 300° C., and particularly preferably higher than 230° C. and lower than 280° C. When the combustion decomposition temperature is within the range described above, the temperature is close to the combustion decomposition temperature of other organic components in the slurry, and the connecting of pores proceeds more efficiently due to carbon dioxide or water vapor produced during decomposition. The pore connecting agent having such a combustion decomposition temperature is not limited to the following, however, examples include methyl polymethacrylate (combustion decomposition temperature: 373° C.), polyethylene glycol hexadecyl ether (polyoxyethylene (20) cetyl ether) (combustion decomposition temperature: 255° C.), polyethylene glycol dodecyl ether (polyoxyethylene (23) lauryl ether), rice starch (combustion decomposition temperature: 320° C.), and melamine cyanurate. Among the same, polyethylene glycol hexadecyl ether, polyethylene glycol dodecyl ether, methyl polymethacrylate, and rice starch are preferable, and polyethylene glycol hexadecyl ether is more preferable. Namely, in a preferable mode of the present invention, the pore connecting agent is selected from the group consisting of polyethylene glycol hexadecyl ether, polyethylene glycol dodecyl ether, methyl polymethacrylate, and rice starch. In a more preferable mode of the present invention, the pore connecting agent is polyethylene glycol hexadecyl ether and/or methyl polymethacrylate. In a particularly preferable mode of the present invention, the pore connecting agent is polyethylene glycol hexadecyl ether. Note that the pore connecting agent may be used alone, or two or more types thereof may be used in combination. Here, the combustion decomposition temperature can be measured by a known method but is preferably measured using TG-DTA (Thermogravimetry-Differential Thermal Analysis). In the present specification, the combustion decomposition temperature is measured by the following method in the examples described below. Note that a commercially available product may be used as the pore connecting agent.

When a pore connecting agent that is a solid at 150° C. is used, the average particle size of the pore connecting agent is an important factor for obtaining a suitable more size distribution according to the present invention. The average particle size of the pore connecting agent is preferably not less than 0.4 μm, more preferably greater than 1 μm, even more preferably not less than 2 μm, and particularly preferably not less than 3 μm. In addition, in order to obtain a suitable pore size distribution according to the present invention, the upper limit of the average particle size of the pore connecting agent is preferably not greater than 15 μm, more preferably less than 10 μm, even more preferably not greater than 6 μm, and particularly preferably not greater than 5 μm. Namely, in a preferable mode of the present invention, the average particle size of the pore connecting agent is not less than 0.4 μm and not greater than 15 μm. In a more preferable mode of the present invention, the average particle size of the pore connecting agent is greater than 1 μm and less than 10 μm. In an even more preferable mode of the present invention, the average particle size of the pore connecting agent is not less than 2 μm and not greater than 6 μm (in particular, not less than 3 μm and not greater than 5 μm). Note that the average particle size of the pore connecting agent described above is determined by randomly selecting arbitrary particles from a scanning electron microscope image, measuring the diameters of 100 particles, and calculating the number average thereof.

The amount of the pore connecting agent that is used (loaded amount) is an important factor for obtaining a suitable pore size distribution according to the present invention. Namely, the amount of the pore connecting agent that is used (used amount) is such that the content of the pore connecting agent in the slurry is less than 20 mass % in terms of solid content. Here, when the content of the pore connecting agent in the slurry is not less than 20 mass %, the pores are excessively connected, such that the pores cease to be pores in the catalyst layer, and the pore volume of pores having the peak 3 therefore decreases. From the perspective of easily obtaining the preferable pore size distribution of the present invention, the content of the pore connecting agent in the slurry is preferably less than 10 mass %, more preferably not greater than 5 mass %, and particularly preferably not greater than 3 mass %. Note that the lower limit of the content of the pore connecting agent in the slurry is not particularly limited, however, the lower limit is ordinarily not less than 0.5 mass % and preferably not less than 1 mass %. Namely, in a preferable mode of the present invention, the content of the pore connecting agent in the slurry is not less than 0.5 mass % and less than 20 mass % in terms of solid content. In a more preferable mode of the present invention, the content of the pore connecting agent in the slurry is not less than 0.5 mass % and less than 10 mass % in terms of solid content. In an even more preferable mode of the present invention, the content of the pore connecting agent in the slurry is not less than 1 mass % and not greater than 5 mass % in terms of solid content. In a particularly preferable mode of the present invention, the content of the pore connecting agent in the slurry is not less than 1 mass % and not greater than 3 mass % in terms of solid content. In addition, in a preferable mode of the present invention, the pore connecting agent is mixed at a ratio such that the content of the pore connecting agent in the slurry is not less than 0.5 mass % and less than 20 mass % (not less than 0.5 mass % and less than 10 mass %, not less than 1 mass % and not greater than 5 mass %, or not less than 1 mass % and not greater than 3 mass %) in terms of solid content. With such an amount, connected pores 3 such as those described above can be formed more easily by the pore connecting agent. In addition, the pores 1, 2, and 3 can connect to one another more easily.

Combustion Aid

The catalyst of the present invention may further contain a combustion aid for promoting the combustion of the pore connecting agent. Here, the combustion aid is not particularly limited, however, a group II element such as magnesium (Mg), calcium (Ca), strontium (Sr), or barium (Ba) generates heat by reacting with water and therefore has a function of promoting the combustion of the pore connecting agent. These elements may be contained in the exhaust gas purifying catalyst in the form of an oxide, a sulfate, or a carbonate. Among the same, Ba or Sr is preferably used as a combustion aid, and barium sulfate ($BaSO_4$) or barium oxide (BaO) is more preferably used as a combustion aid. One type of combustion aid may be used alone, or two or more types thereof may be used in combination.

The content of the combustion aid (in particular, $BaSO_4$ or BaO) is preferably from 0 to 50 g, more preferably from 0.1 to 30 g, and even more preferably from 0.5 to 20 g per 1 liter of the three-dimensional structure.

Three-Dimensional Structure

The catalyst of the present invention includes a precious metal, alumina, and a ceria/zirconia composite oxide supported on a three-dimensional structure.

Here, the three-dimensional structure is not particularly limited, and a refractory three-dimensional structure that is ordinarily used in this field can be similarly used. As the three-dimensional structure, for example, a refractory carrier such as a honeycomb carrier having channels (gas passage holes, cell shapes) with a triangular shape, a rectangular shape, or a hexagonal shape can be used. The three-dimensional structure is preferably an integrally molded structure (three-dimensional integral structure, integral weir structure). For example, a monolith carrier, a metal honeycomb carrier, a punching metal, or the like may be preferably used.

A monolith carrier may be a carrier commonly known as a ceramic honeycomb carrier. In particular, a carrier containing cordierite, mullite, alumina, α-alumina, silicon carbide, silicon nitride, or the like as a material is preferable, and of these, a carrier made of cordierite (cordierite carrier) is particularly preferable. In addition, an integral structure formed using an oxidation-resistant, refractory metal including stainless steel, an Fe—Cr—Al alloy, or the like may be used.

These monolith carriers are produced by an extrusion molding method, a method of winding and solidifying a sheet-like element, or the like. The shape of the channels (gas passage holes, cell shapes) may be hexagonal (honeycomb), rectangular, triangular, or corrugated (corrugation shape). The channels can be adequately used as long as the cell density (number of cells/unit cross-sectional area) is from 100 to 1200 cells/square inch, and the cell density is preferably from 200 to 900 cells/square inch, more preferably from 200 to 600 cells/square inch, and even more preferably from 250 to 500 cells/square inch (1 inch=25.4 mm).

Production Method for Exhaust Gas Purification Catalyst

The exhaust gas purification catalyst of the present invention can be produced by appropriately referencing a known technique, however, as described above, the catalyst of the present invention has a peak 1 at a pore size of not less than 0.001 μm and not greater than 0.05 μm, pores having a peak 2 at a pore size of not less than 2.5 μm and not greater than 5.0 μm, and pores having a peak 3 at a different pore size than the above pore sizes in a pore size distribution measured by the mercury intrusion method, and has a specific pore size distribution in which the pore volume of the pores having the peak 3 is greater than 1.4% of the total pore volume. In order to obtain such a structure, it is important to apply a slurry containing a pore connecting agent having a specific combustion decomposition temperature (150 to 400° C.) in addition to the catalyst components to the three-dimensional structure and then hold (heat treat) the structure at a specific temperature difference relative to the combustion decomposition temperature described above.

Namely, the present invention also provides a production method for a gasoline engine exhaust gas purification catalyst, the method including: preparing a slurry by mixing a pore connecting agent having a combustion decomposition temperature of 150 to 400° C., a precious metal precursor, alumina, and a ceria/zirconia composite oxide; applying the slurry to a three-dimensional structure; and then holding the three-dimensional structure in air at a temperature higher than −150° C. and not higher than +50° C. relative to the combustion decomposition temperature. Herein, the content of the pore connecting agent in the slurry is not less than 0.5 mass % and less than 20 mass % in terms of solid content (second aspect of the present invention). The specific pore size distribution according to the present invention is achieved by performing heat treatment under specific temperature conditions using a specific pore connecting agent.

In the following, a production method for an exhaust gas purification catalyst according to the present invention will be described as a preferable mode of the present invention, the method including: (a) a slurry preparation step, (b) a slurry application step, (c) a drying step, (d) a pore connecting step, and (e) a calcining step. Note that for configurations other than the characteristic part of the present invention ((d) pore connecting step), known methods other than those described below can be applied in the same manner or with appropriate modifications, and the present invention is not limited only by the preferable modes described below. In addition, in the following, a "pore connecting agent having a combustion decomposition temperature of 150 to 400° C." is also simply called a "pore connecting agent".

(a) Slurry Preparation Step

In this step, a slurry is prepared by mixing a pore connecting agent, a precious metal source (precious metal precursor), alumina, a ceria/zirconia composite oxide, and, if necessary, other added components [a slurry containing raw materials that ultimately form each of the catalyst components (precious metal, alumina, ceria/zirconia composite oxide, and the like) and a pore connecting agent is prepared]. The slurry is prepared by mixing and wet-milling the raw materials of each of the catalyst components and the pore connecting agent in an aqueous medium. Note that ordinary materials used in this field can be appropriately used as the raw materials of each of the catalyst components. For example, alumina or the ceria/zirconia composite oxide is the same as described above (type, supported amount, and the like), so a description thereof is omitted here. In addition, when the catalyst of the present invention contains other added components, each of the added components is the same as described above (type, supported amount, and the like), so a description thereof is omitted here. Note that since the descriptions of the pore connecting agent, the precious metal source, alumina, the ceria/zirconia composite oxide, and other added components are the same as above, descriptions thereof are omitted here.

As an aqueous medium, for example, water (purified water, ultrapure water, deionized water, distilled water, or the like), a lower alcohol such as ethanol or 2-propanol, an organic alkaline aqueous solution, or the like can be used. Among the same, water or a lower alcohol is preferably used, and water is more preferably used. The amount of the aqueous medium is not particularly limited, but the amount is preferably such that the ratio of solid content in the slurry (solid content mass concentration) is from 5 to 60 mass % and more preferably from 10 to 50 mass %. The ratio of solid content can be calculated from the ratio of the mass of solid content remaining after placing the above slurry in a crucible and calcining in air for 30 minutes at 550° C. relative to the mass of the slurry before calcining for 30 minutes at 550° C. The slurry also contains a pore connecting agent having a combustion decomposition temperature of 150 to 400° C.

Here, the order in which the precious metal source, alumina, the ceria/zirconia composite oxide, the pore connecting agent, other added components, and the like are added is not particularly limited, and the components may be added collectively to an aqueous medium or may be added separately in an appropriate order. For example, after alumina, the ceria/zirconia composite oxide, the pore connecting agent, and other added components are added to the aqueous medium and stirred for 5 minutes to 24 hours, the precious metal source may be added and then stirred for 5 minutes to 24 hours. Alternatively, after alumina and the ceria/zirconia composite oxide are added to the aqueous medium and stirred for 5 minutes to 24 hours, the pore connecting agent may be added and stirred for 5 minutes to 24 hours, and after the precious metal source is then added and stirred for 5 minutes to 24 hours, other added components may be added. Alternatively, after the precious metal source, alumina, and the ceria/zirconia composite oxide are added to the aqueous medium and stirred for 5 minutes to 24 hours, the pore connecting agent may be added and stirred for 5 minutes to 24 hours, and other added components may then be added. In the above, the pH of the mixture (slurry) after each raw material is added is preferably adjusted to 6 or higher and preferably 7 or higher and less than 8. Therefore, when the pH of the mixture (slurry) after each addition step is 8 or higher, the pH is preferably adjusted to lower than 8 using an acid such as hydrochloric acid, sulfuric acid, nitric acid, or carbonic acid. In addition, when the pH of the mixture (slurry) after each addition step is lower than 6, the pH is adjusted to 6 or higher and preferably 7 or higher using a base such as ammonia, sodium hydroxide, potassium hydroxide, sodium carbonate, or potassium carbonate.

Next, the slurry obtained in this way is wet-milled. Here, wet milling can be performed by a known method using a ball mill, for example. In addition, the wet milling conditions are not particularly limited. For example, wet milling is preferably performed for 5 minutes to 5 hours at a rotational speed of 50 to 5000 rpm. By wet-milling under such conditions, the average particle size of the pore connecting agent becomes around 5 μm (or less). Note that the stirring described above may also be performed by wet milling.

(b) Slurry Application Step

In this step, the slurry obtained in the slurry preparation step (a) described above is applied to the three-dimensional structure. A known method such as wash coating may be appropriately used as the method for applying the slurry to the three-dimensional structure. The applied amount of slurry may be appropriately set by a person skilled in the art according to the amount of solid matter in the slurry and the thickness of the catalyst layer to be formed. The applied amount of the slurry is preferably an amount such that the contents (supported amounts) of the precious metal, alumina, the ceria/zirconia composite oxide, and any other added components (if any) are as described above.

(c) Drying Step

The drying step is a step of drying the slurry on the three-dimensional structure applied in the slurry application step.

In the drying step, the slurry coating film applied to the three-dimensional structure is dried for 5 minutes to 10 hours and preferably 15 minutes to 3 hours at a temperature of preferably from 50 to 170° C. and more preferably from 70 to 150° C.

(d) Pore Connecting Step

In this step, the dried slurry coating film (catalyst precursor) obtained in (c) above is heat-treated (held) in air at a temperature greater than −150° C. and not higher than +50° C. relative to the combustion decomposition temperature. As described above, this step causes the combustion and decomposition of the pore connecting agent and removes the pore connecting agent in the dried slurry coating film (catalyst precursor) as a mass of gas so as to form pores 2 and 3 and to connect the pores 1, 2, and 3 to one another. In contrast, when the calcining step is performed after the drying step without a pore connecting step, the pore size distribution according to the present invention cannot be stably achieved. Note that when the calcining step is performed after the pore connecting step without a drying step, it may be difficult to make the pore sizes and the pore volumes of the pores 2 and 3 conform to the preferable ranges described above.

Here, the heat treatment temperature in the pore connecting step (d) is higher than −150° C. and not higher than +50° C. relative to the combustion decomposition temperature. Note that the pore connecting agent starts to combust and decompose at around −50° C. of the combustion decomposition temperature. However, when the heat treatment temperature is not higher than −150° C. relative to the combustion decomposition temperature, the pore connecting agent does not combust sufficiently, so a sufficient amount of a mass of gas cannot be generated, and the pore connecting agent combusts at once in the following calcining step (e). As a result, connected pores 3 having sufficient pore volume cannot be formed. In addition, when the heat treatment gas exceeds +50° C. relative to the combustion decomposition temperature, the pore connecting agent combusts at once, so excessively large pores are formed (the pores 2 are difficult to form or are not formed at all). As a result, the diffusibility of the exhaust gas is too high, and the exhaust gas that passes through without coming into contact with the catalyst components increases, resulting in a decrease in the exhaust gas purification rate. The heat treatment temperature is preferably not lower than −100° C. and not higher than +40° C., more preferably not lower than −50° C. and not higher than +35° C., and particularly preferably higher than 0° C. and lower than +30° C. relative to the combustion decomposition temperature. The heat treatment temperature described above can be particularly suitably applied to a pore connecting agent having a combustion decomposition temperature of lower than 300° C., such as polyethylene glycol hexadecyl ether. In addition, for a pore connecting agent having a combustion decomposition temperature of 300° C. or higher, such as methyl polymethacrylate, the heat treatment temperature is preferably higher than −100° C. and lower than −85° C. relative to the combustion decomposition temperature. By allowing the pore connecting agent to combust at such a heat treatment temperature, the pore sizes and pore volumes of the pores 2 and 3 can be more easily controlled to within the preferable ranges described above. In addition, the heat treatment time is not particularly limited as long as the pores 1, 2, and 3 are connected to one another to obtain the pore size distribution according to the present invention. The heat treatment time is preferably from 10 minutes to 3 hours and more preferably from 15 minutes to 1 hour. By allowing the pore connecting agent to combust for such a heat treatment time, the pore sizes and pore volumes of the pores 2 and 3 can be more easily controlled to within the preferable ranges described above.

In addition, the heat treatment in the pore connecting step (d) is preferably performed while circulating a gas such as air. This operation allows organic components (in particular, the pore connecting agent) to be removed more efficiently. Here, the rate at which the gas is circulated (gas flow rate) is not particularly limited, however, the rate is preferably not less than 0.1 m/sec and more preferably from 0.2 to 1.2 m/sec.

(c) Calcining Step

In this step, the coating film is fired after (d) described above. As a result, the catalyst components (precious metal, alumina, ceria/zirconia composite oxide, and the like) are adhered to the three-dimensional structure. In addition, nitrogen containing components, hydrogen-containing components, and carbon-containing components remaining in the catalyst layer are removed.

Here, the calcining conditions are not particularly limited. For example, calcining is performed in air at a temperature of 440° C. to 800° C., preferably from 450° C. to 610° C., and more preferably from 450° C. to 555° C. for 10 minutes to 3 hours and preferably from 15 minutes to 1 hour. Under such conditions, the catalyst components (precious metal, alumina, ceria/zirconia composite oxide, and the like) can be efficiently adhered to the three-dimensional structure.

In addition, calcining is preferably performed while circulating a gas such as air. This operation also allows organic components (in particular, the pore connecting agent) to be removed more efficiently. Here, the rate at which the gas is circulated (gas flow rate) is not particularly limited, however, the rate is preferably not less than 0.1 m/sec and more preferably from 0.2 to 1.2 m/sec.

The catalyst of the present invention can be produced as described above.

Exhaust Gas Purification Method

The catalyst of the present invention can exhibit high purification performance with respect to exhaust gas (hydrocarbons (HC), carbon monoxide (CO), and nitrogen oxides (NOx)) emitted from a gasoline engine. Therefore, the present invention also provides a gasoline engine exhaust gas purification method. Such a method includes treating exhaust gas (in particular, purifying hydrocarbons (HC), carbon monoxide (CO), and nitrogen oxides (NOx) in exhaust gas) emitted from a gasoline engine using the exhaust gas purification catalyst of the present invention (third aspect of the present invention). The exhaust gas purification rate (purification properties) can be evaluated using a gasoline engine on the basis of the temperature (T50 (° C.)) when each purification rate for CO, THC, and NOx reaches 50% in a light-off (LO) test described below, for example. Note that a lower T50 value indicates that the catalyst exhibits higher exhaust gas purification performance.

Exhaust gas ordinarily contains HC, CO, and NOx. For example, exhaust gas contains nitrogen oxides (for example, NO, $NO_2$, and $N_2O$), carbon monoxide (CO), carbon dioxide ($CO_2$), oxygen ($O_2$), hydrogen ($H_2$), ammonia ($NH_3$), water ($H_2O$), sulfur dioxide ($SO_2$), hydrocarbons (HC), and the like at given ratios.

The gasoline engines to which the exhaust gas purification method of the present invention is applied are intended to exclude diesel engines, and include, in addition to ordinary gasoline engines, gasoline hybrid engines and engines which use natural gas, ethanol, dimethyl ether, or the like as fuel, for example. Among the same, a gasoline engine is preferable.

An example of the method for bringing the exhaust gas into contact with the catalyst of the present invention is a method of installing the exhaust gas purification catalyst in the exhaust passage of the exhaust port of a gasoline engine and circulating exhaust gas into the exhaust passage.

The temperature of the exhaust gas is preferably from 0° C. to 800° C.; that is, within a temperature range of the exhaust gas during normal operation of a gasoline engine. Here, the air-fuel ratio (A/F) in the exhaust gas of a gasoline engine having a temperature of 0° C. to 800° C. is from 10 to 30 and preferably from 11 to 14.7. Alternatively, as another preferable mode, the temperature of the exhaust gas may be within a high temperature range of 800 to 1200° C. Here, the air-fuel ratio in the exhaust gas of an internal combustion engine having a temperature of 800 to 1200° C. is preferably from 10 to 18.6.

Further, the catalyst of the present invention can exhibit an excellent exhaust gas treating effect for low-temperature exhaust gas of 50 to 600° C. (in particular, including HC, CO, NOx, water vapor, or the like) or low-temperature exhaust gas of 50 to 600° C. after having been exposed for a long period of time to high-temperature exhaust gas having a catalyst bed temperature of 650 to 900° C. (in particular, including HC, CO, NOx, water vapor, or the like).

Thus, the catalyst of the present invention described above, or a catalyst produced by the method described above may be exposed to exhaust gas having a temperature of 650 to 900° C. and preferably from 700 to 850° C. Further, the amount of time that the catalyst of the present invention is exposed to high-temperature exhaust gas (amount of time that the exhaust gas is allowed to flow) is also not particularly limited, however, the amount of time is, for example, from 10 to 800 hours, preferably from 16 to 500 hours, and more preferably from 40 to 100 hours. Even after being exposed to such a high-temperature exhaust gas, the catalyst of the present invention has high performance. In order to investigate the exhaust gas purification performance of the catalyst after being exposed to high-temperature exhaust gas in this way, it is effective to subject the catalyst to treatment involving exposure to exhaust gas at 650 to 900° C. for 10 to 300 hours as thermal aging and to then evaluate the exhaust gas purification performance (resistance to catalyst deterioration).

Note that in the present specification, the "temperature of the exhaust gas" refers to the temperature of the exhaust gas at the catalyst inlet. Here, the "catalyst inlet" refers to a portion extending 10 cm from the catalyst end face on the exhaust gas inflow side toward the internal combustion engine side in the exhaust pipe in which the exhaust gas purification catalyst is installed, and also refers to the location of the center portion in the longitudinal direction (axial direction) of the exhaust pipe. In addition, in the present specification, the "catalyst bed" refers to a center portion between the catalyst end face on the exhaust gas inflow side and the catalyst end face on the exhaust gas outflow side in the exhaust pipe, and also refers to the location of the center portion of a cross section of the exhaust pipe (when the cross section of the exhaust pipe is not circular, this is the location of the center of gravity of the cross section of the exhaust pipe).

EXAMPLES

The effects of the present invention will be described using the following examples and comparative examples. However, the technical scope of the present invention is not limited to the following examples. Note that in the following examples, unless indicated otherwise, operations were performed at room temperature (25° C.). In addition, unless indicated otherwise, "%" and "parts" refer to "mass %" and "parts by mass", respectively.

Example 1

Palladium nitrate serving as a palladium raw material, rhodium nitrate serving as a rhodium raw material, a ceria/zirconia/lanthana/yttria composite oxide (BET specific surface area: 80 m$^2$/g, Ce/Zr molar ratio: 1/2.8, average secondary particle size: 10 μm), lanthana-containing alumina (lanthana content: 5 mass %, average secondary particle size: 73 μm, BET specific surface area: 148 m$^2$/g), barium oxide, and polyethylene glycol hexadecyl ether (polyoxyethylene (20) cetyl ether) (manufactured by SIGMA-ALDRICH, Brij (Registered Trademark) 58) were respectively weighed such that the mixing ratio of Pd, Rh, the ceria/zirconia/lanthana/yttria composite oxide, lanthana-containing aluminum, barium oxide, and polyethylene glycol hexadecyl ether was 0.5:0.15:80:120:1.5:2.02. Each weighed material excluding polyethylene glycol hexadecyl ether was dispersed in purified water, and after the dispersion was wet-milled for 20 minutes at a rotation speed of 200 rpm using a wet mill (ball mill), polyethylene glycol hexadecyl ether (Brij 58) was added and similarly wet-milled for 5 more minutes to prepare a slurry A1. Note that the content of polyethylene glycol hexadecyl ether in the slurry A1 (in terms of solid content) is 1 mass %.

This slurry A1 was wash-coated onto a cylindrical 0.066 L cordierite carrier (600 cells per 1 square inch, cell wall thickness: 4 milli-inches) with rectangular channels having a diameter of 33 mm and a length of 76 mm to obtain a precursor A2.

Next, the precursor A2 was dried for 20 minutes at 150° C. to obtain a precursor A3. Further, the precursor A3 was held (heat-treated) in air for 20 minutes at 280° C. (pore connecting step), and the pore connecting agent was subjected to combustion decomposition to obtain a precursor A4. Next, the precursor A4 was calcined in air for one hour at 500° C. to obtain a catalyst A. Note that the catalyst A obtained in this way is one in which the cordierite carrier was coated with 202.15 g of catalyst components (0.5 g of palladium, 0.15 g of rhodium, 80 g of ceria/zirconia/lanthana/yttria composite oxide, 120 g of lanthana-containing alumina, and 1.5 g of barium oxide) per 1 L of the carrier.

In addition, the combustion decomposition temperature of polyethylene glycol hexadecyl ether (pore connecting agent) was measured to be 255° C. with the following method using a thermogravimetry-differential thermal analyzer (TG-DTA). Note that polyethylene glycol hexadecyl ether (pore connecting agent) began to combust at around 200° C.

Method for Measuring Combustion Decomposition Temperature of Pore Connecting Agent First, 30 mg of the pore connecting agent (sample) is placed on the balance of a TGA (manufactured by Bruker AXS, trade name: TG-DTA2020SR) through which a carrier gas (air) is circulated, and after the baseline stabilizes, the differential heat is measured when the sample undergoes combustion decomposition under conditions in which the sample is heated from 25° C. to 800° C. at a rate of 10° C./min under an air flow of 100 ml/min. Here, combustion decomposition refers to a state in which differential heat of 100 μV or greater per 30 mg of the sample is generated in the DTA profile of the TG-DTA measurement data, and no more differential heat is generated thereafter. The temperature at which the above state (state of maximum differential heat) is indicated is referred to as the "combustion decomposition temperature (° C.) of the pore connecting agent".

Example 2

A catalyst B was obtained in accordance with the same method as in Example 1 with the exception that each material was weighed such that the mixing ratio of Pd, Rh, the ceria/zirconia/lanthana/yttria composite oxide, lanthana-containing alumina, barium oxide, and polyethylene glycol hexadecyl ether in Example 1 was 0.5:0.15:80:120:1.5:6.06. Note that the polyethylene glycol hexadecyl ether content (in terms of solid content) in the slurry is 3 mass %.

Figure 4:
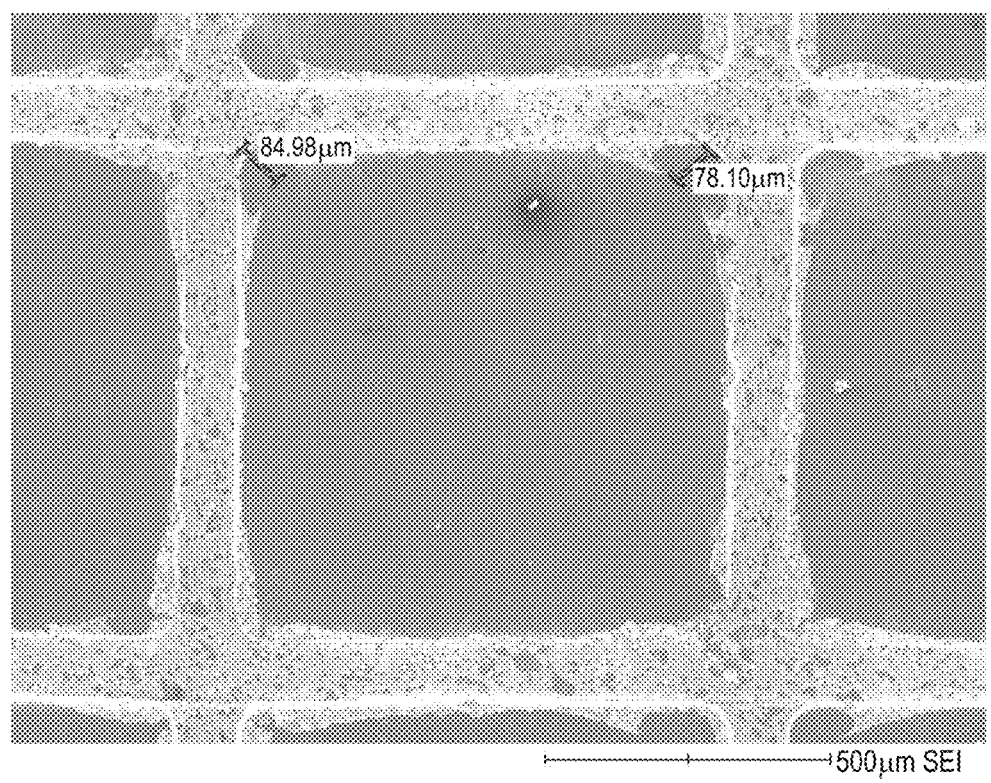
FIG. 4 is an SEM photograph illustrating the state of a catalyst layer (cross-section) formed on the cell inner surface of the catalyst B.

The condition (cross section) of the catalyst layer formed on the cell surface of the catalyst B obtained in this way was observed by SEM. The results are illustrated in FIG. 4. As illustrated in FIG. 4, it can be seen that pores having a pore size of 70 to 90 μm are formed in the corner portions of the cells of the catalyst B.

Example 3

A catalyst C was obtained in accordance with the same method as in Example 1 with the exception that each material was weighed such that the mixing ratio of Pd, Rh, the ceria/zirconia/lanthana/yttria composite oxide, lanthana-containing alumina, barium oxide, and polyethylene glycol hexadecyl ether in Example 1 was 0.5:0.15:80:120:1.5:10.11. Note that the polyethylene glycol hexadecyl ether content (in terms of solid content) in the slurry is 5 mass %.

Figure 5:
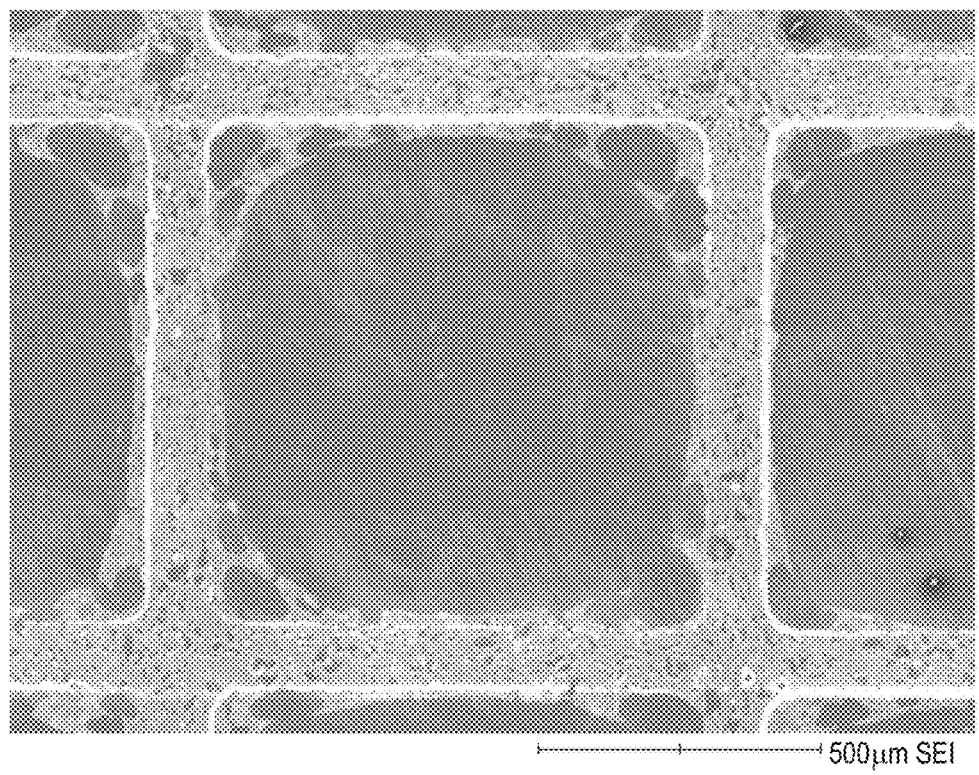
FIG. 5 is an SEM photograph illustrating the state of a catalyst layer (cross-section) formed on the cell inner surface of the catalyst C.

The condition (cross section) of the catalyst layer formed on the cell surface of the catalyst C obtained in this way was observed by SEM. The results are illustrated in FIG. 5. As illustrated in FIG. 5, it can be seen that pores having a pore size of 70 to 110 μm are formed in the corner portions of the cells of the catalyst C.

Example 4

A catalyst D was obtained in accordance with the same method as in Example 1 with the exception that each material was weighed such that the mixing ratio of Pd, Rh, the ceria/zirconia/lanthana/yttria composite oxide, lanthana-containing alumina, barium oxide, and polyethylene glycol hexadecyl ether in Example 1 was 0.5:0.15:80:120:1.5:20.22. Note that the polyethylene glycol hexadecyl ether content (in terms of solid content) in the slurry is 10 mass %.

The condition (cross section) of the catalyst layer formed on the cell surface of the catalyst D obtained in this way was observed by SEM. The results are illustrated in FIG. 6. As illustrated in FIG. 6, it can be seen that pores having a pore size of 70 to 110 μm are formed in the corner portions of the cells of the catalyst D.

Example 5

A catalyst E was obtained in accordance with the same method as in Example 1 with the exception that methyl polymethacrylate (average particle size: 2.5 μm) was used instead of polyethylene glycol hexadecyl ether in Example 3. Note that the methyl polymethacrylate content (in terms of solid content) in the slurry is 5 mass %.

In addition, the combustion decomposition temperature of methyl polymethacrylate (pore connecting agent) was measured to be 373° C. in the same manner as in the method described in Example 1. Note that methyl polymethacrylate (pore connecting agent) began to combust at around 321° C.

Comparative Example 1

A catalyst F was obtained in accordance with the same method as in Example 1 with the exception that polyethylene glycol hexadecyl ether was not added in Example 1. Note that the polyethylene glycol hexadecyl ether content in the slurry is 0 mass %.

Figure 7:
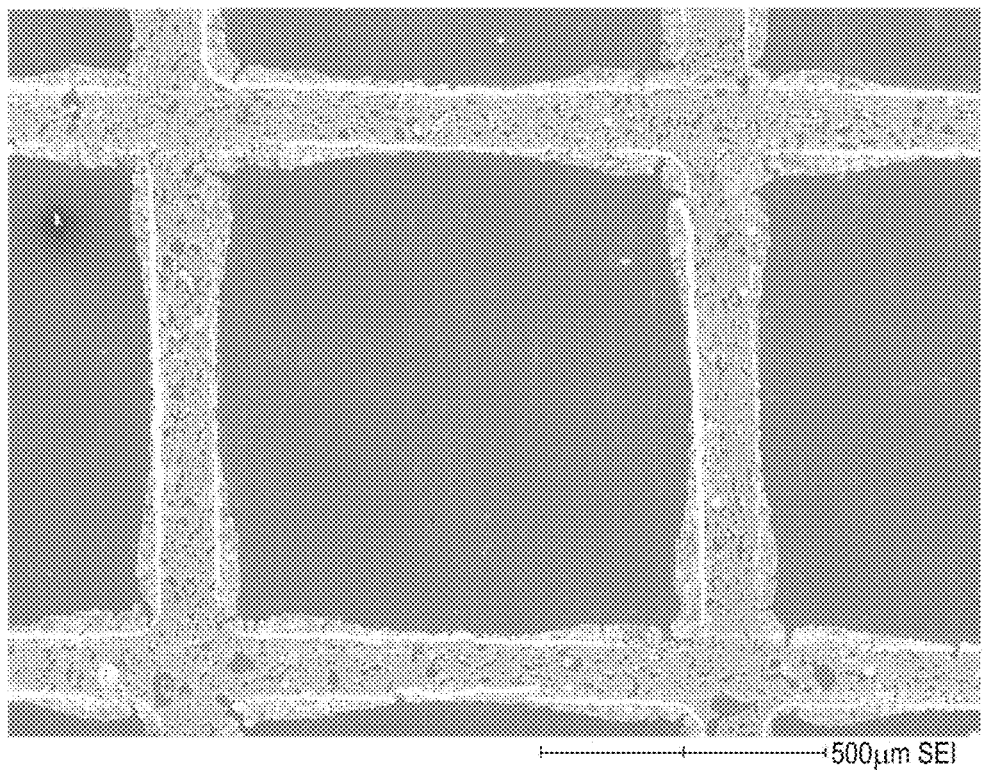
FIG. 7 is an SEM photograph illustrating the state of a catalyst layer (cross-section) formed on the cell inner surface of the catalyst F.

The condition (cross section) of the catalyst layer formed on the cell surface of the catalyst F obtained in this way was observed by SEM. The results are illustrated in FIG. 7. As illustrated in FIG. 7, it can be seen that no pores having a pore size of not less than 70 μm are formed in the corner portions of the cells of the catalyst F. From a comparison of FIGS. 4 to 6 and FIG. 7, large pores having a pore size of 70 to 110 μm are considered to be derived from the pore connecting agent.

Comparative Example 2

A catalyst G was obtained in accordance with the same method as in Example 1 with the exception that each material was weighed such that the mixing ratio of Pd, Rh, the ceria/zirconia/lanthana/yttria composite oxide, lanthana-containing alumina, barium oxide, and polyethylene glycol hexadecyl ether in Example 1 was 0.5:0.15:80:120:1.5:40.43. Note that the polyethylene glycol hexadecyl ether content in the slurry is 20 mass %.

Comparative Example 3

A catalyst H was obtained in accordance with the same method as in Example 1 with the exception that activated carbon (average particle size: 6.1 μm) was used instead of polyethylene glycol hexadecyl ether in Example 3. Note that the activated carbon content (in terms of solid content) in the slurry is 5 mass %.

In addition, the combustion decomposition temperature of activated carbon (pore connecting agent) was measured to be 586° C. in the same manner as in the method described in Example 1. Note that activated carbon (pore connecting agent) began to combust at around 500° C.

Figure 3:
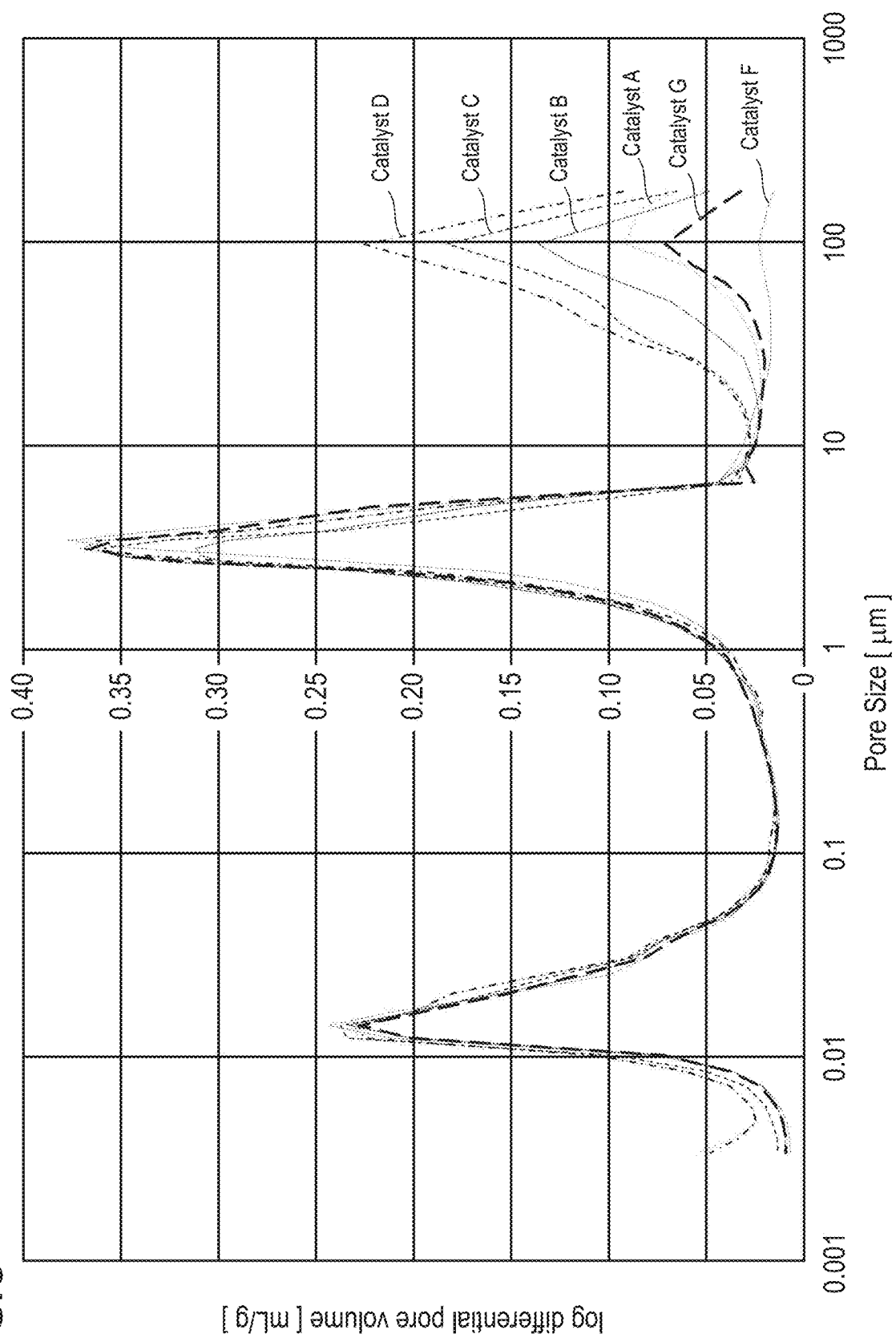
FIG. 3 shows the pore size distributions of catalysts A to D (Examples 1 to 4) and catalysts F and G (Comparative Examples 1 and 2).

The pore size distributions of the catalysts A to H obtained as described above were measured with the mercury intrusion method as follows. The pore size distributions of catalysts A to D, F, and G are shown in FIG. 3. In addition, the pore sizes of the connected pores 1, 2, and 3 and the ratio (%) of the volume of each of the pores to the total pore volume were determined as follows. The results are shown in the following Table 1. Note that, in Table 1 below, the type, the combustion decomposition temperature (° C.), the difference between the heat treatment temperature and the combustion decomposition temperature (° C.) [=heat treatment temperature (° C.)–combustion decomposition temperature (° C.)] ("temperature difference (° C.)" in Table 1 below), and the loaded amount (mass % (in terms of solid content)) of each pore connecting agent used in each example and each comparative example are also shown.

Pore Size Distribution Measurement

The pore size distributions of catalysts A to H (samples) were measured by the mercury intrusion method. Specifically, a 600 mg sample was measured using a porosimeter (manufactured by the Shimadzu Corporation, trade name: Autopore III 9420). For the pores 1, 2, and 3 of each catalyst, the pore size (pore diameter) of each peak and the ratio (%) of the pore volume of the peak to the total pore volume were determined. The results are shown in Table 1.

TABLE 1

| Catalyst | Pore connecting agent | Combustion decomposition temperature [° C.] | Temperature difference*[1] [° C.] | Used amount [mass %] |
|---|---|---|---|---|
| A | Polyethylene glycol hexadecyl ether | 255 | 25 | 1 |
| B | Polyethylene glycol hexadecyl ether | 255 | 25 | 3 |
| C | Polyethylene glycol hexadecyl ether | 255 | 25 | 5 |
| D | Polyethylene glycol hexadecyl ether | 255 | 25 | 10 |
| E | Methyl polymethacrylate | 373 | −93 | 5 |
| F | Not used | — | — | 0 |
| G | Polyethylene glycol hexadecyl ether | 255 | 25 | 20 |
| H | Activated carbon | 586 | −306 | 5 |

| | Pores 1 | | Pores 2 | | Pores 3 | |
|---|---|---|---|---|---|---|
| Catalyst | Peak 1 pore size (μm) | Percentage of total pore volume [%] | Peak 2 pore size (μm) | Percentage of total pore volume [%] | Peak 3 pore size (μm) | Percentage of total pore volume [%] |
| A | 0.0143 | 4.7 | 3.1 | 7.6 | 98.17 | 1.9 |
| B | 0.0143 | 4.6 | 3.1 | 6.2 | 98.17 | 2.7 |
| C | 0.0143 | 4.3 | 3.1 | 6.4 | 98.17 | 3.3 |
| D | 0.0143 | 3.9 | 3.1 | 6.2 | 98.17 | 3.8 |

TABLE 1-continued

| | | | | | | |
|---|---|---|---|---|---|---|
| E | 0.0143 | 4.5 | 3.1 | 6.6 | 0.76 | 3.9 |
| F | 0.0143 | 5.5 | 3.4 | 8.5 | — | — |
| G | 0.0143 | 4.3 | 3.1 | 7.0 | 98.17 | 1.4 |
| H | 0.0143 | 4.3 | 3.2 | 10.3 | — | — |

*[1]Difference between the heat treatment temperature and the combustion decomposition temperature (° C.) [=heat treatment temperature (° C.) − combustion decomposition temperature (° C.)]

Exhaust Gas Purification Performance Evaluation Test: Light-off (LO) Test

The exhaust gas purification performance was evaluated as follows for the catalysts A to H of Examples 1 to 5 and Comparative Examples 1 to 3. Specifically, each catalyst (0.066 L) was installed 25 cm downstream from exhaust port of an MPI engine with an exhaust volume of 3.0 liters. Thermal aging treatment (durability treatment) was performed at 900° C. (catalyst inlet temperature) for 50 hours at A/F=14.6, amplitude=±0.5, and frequency=1.0 Hz. Note that the catalyst inlet temperature was measured 1 cm upstream of the catalyst end face.

Next, exhaust gas was circulated through each catalyst with A/F=14.6, amplitude=±0.5, frequency=1.0 Hz, and the catalyst inlet gas temperature was raised from 150° C. to 500° C. at 20° C./min. Gas emitted from the catalyst outlet at this time was sampled, and the purification rate of each of CO, HC, and NOx was calculated. Defining the temperature at which the purification rate of each gas reached 50% as T50 (° C.), the results are shown in Table 2 below. A lower T50 value indicates higher conversion of each gas (higher catalyst performance).

It can be seen from Table 2 below that the catalysts A to E of Examples 1 to 5 have significantly lower T50 values for each gas (CO, HC, and NOx) than the catalysts F to H of Comparative Examples 1 to 3, and therefore have significantly higher catalyst performance.

TABLE 2

| | T50 (° C.) | | |
|---|---|---|---|
| Catalyst | CO | HC | NOx |
| A | 353 | 361 | 355 |
| B | 354 | 361 | 355 |
| C | 354 | 362 | 356 |
| D | 363 | 370 | 367 |
| E | 357 | 366 | 361 |
| F | 379 | 387 | 380 |
| G | 392 | 401 | 396 |
| H | 393 | 404 | 397 |

The present application is based on Japanese Patent Application No. 2018-212053 filed on Nov. 12, 2018, the disclosed content of which is incorporated by reference in its entirety.

DESCRIPTION OF REFERENCE NUMERALS

10 . . . Catalyst
1 . . . Pores having a small pore size (pores 1)
2 . . . Pores having an intermediate pore size (pores 2)
3 . . . Pores having a large pore size (pores 3)
12 . . . Exhaust gas
14 . . . Catalyst layer
15 . . . Three-dimensional structure

What is claimed is:

1. A gasoline engine exhaust gas purification catalyst for purifying exhaust gas emitted from a gasoline engine; the catalyst comprising a precious metal, alumina, and a ceria/zirconia composite oxide supported on a three-dimensional structure; the catalyst having pores having a peak 1 at a pore size of not less than 0.001 μm and not greater than 0.05 μm, pores having a peak 2 at a pore size of not less than 2.5 μm and not greater than 5.0 μm, and pores having a peak 3 at a pore size of not less than 90 μm and not greater than 110 μm measured by mercury intrusion method; and the pore volume of the pores having the peak 3 being greater than 1.4% of the total pore volume.

2. The gasoline engine exhaust gas purification catalyst according to claim 1, wherein the pore volume of the pores having the peak 3 is greater than 1.4% and not greater than 5.0% of the total pore volume.

3. The gasoline engine exhaust gas purification catalyst according to claim 1, wherein the three-dimensional structure is a honeycomb carrier having triangular, rectangular, or hexagonal channels, and the precious metal, alumina, and ceria/zirconia composite oxide are supported on the corner portions of the channels so that the catalyst has pores with a pore size of not less than 70 μm.

4. The gasoline engine exhaust gas purification catalyst according to claim 1, wherein the precious metal is at least one of platinum or palladium and rhodium.

5. A production method for a gasoline engine exhaust gas purification catalyst according to claim 1, the method comprising: preparing a slurry by mixing a pore connecting agent having a combustion decomposition temperature of 150 to 400° C., a precious metal precursor, alumina, and a ceria/zirconia composite oxide; applying the slurry to a three-dimensional structure; and then holding the three-dimensional structure in air at a temperature higher than −150° C. and not higher than +50° C. relative to the combustion decomposition temperature; wherein the content of the pore connecting agent in the slurry is less than 20 mass % in terms of solid content.

6. The method according to claim 5, wherein the pore connecting agent is selected from a group consisting of polyethylene glycol hexadecyl ether, polyethylene glycol dodecyl ether, methyl polymethacrylate, and rice starch.

7. A gasoline engine exhaust gas purification method, the method comprising contacting exhaust gas emitted from a gasoline engine with the exhaust gas purification catalyst according to claim 1.

* * * * *